United States Patent
Peterson et al.

(10) Patent No.: US 8,265,835 B2
(45) Date of Patent: Sep. 11, 2012

(54) METHOD AND SYSTEM FOR PREVENTING HERBICIDE APPLICATION TO NON-TOLERANT CROPS

(75) Inventors: Todd A. Peterson, Johnston, IA (US); Douglas L. Gardner, Johnston, IA (US); Douglas J. Houser, Slater, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 938 days.

(21) Appl. No.: 12/274,433

(22) Filed: Nov. 20, 2008

(65) Prior Publication Data

US 2009/0132132 A1 May 21, 2009

Related U.S. Application Data

(60) Provisional application No. 60/989,350, filed on Nov. 20, 2007.

(51) Int. Cl.
*B05B 12/00* (2006.01)

(52) U.S. Cl. .............................. 701/50; 702/5

(58) Field of Classification Search .................... 701/50, 701/300, 400, 408, 466, 467, 493, 468; 702/45, 702/47, 50, 5; 137/1, 2, 12, 14; 239/63, 239/67, 68, 398, 407, 1, 302; 417/43; 800/260, 800/295, 298; 342/352, 357.24; 47/1.7, 47/58.1 R See application file for complete search history.

(56) References Cited

U.S. PATENT DOCUMENTS

| | | | |
|---|---|---|---|
| 5,704,546 A | 1/1998 | Henderson et al. | |
| 5,809,440 A | 9/1998 | Beck et al. | |
| 5,971,294 A | 10/1999 | Thompson et al. | |
| 6,216,614 B1 | 4/2001 | Wollenhaupt | |
| 6,250,564 B1 | 6/2001 | Chahley | |
| 6,445,983 B1 | 9/2002 | Dickson et al. | |
| 6,691,135 B2 * | 2/2004 | Pickett et al. | 1/1 |
| 7,103,451 B2 | 9/2006 | Seal et al. | |
| 7,110,881 B2 | 9/2006 | Gray et al. | |
| 7,256,388 B2 | 8/2007 | Eglington et al. | |
| 7,848,865 B2 * | 12/2010 | Di Federico et al. | 701/50 |
| 8,027,770 B2 * | 9/2011 | Poulsen | 701/50 |
| 2009/0114210 A1 * | 5/2009 | Guice et al. | 126/569 |

* cited by examiner

*Primary Examiner* — Dalena Tran
(74) *Attorney, Agent, or Firm* — Woodcock Washburn LLP

(57) ABSTRACT

A method controlling an agricultural sprayer includes identifying an herbicide to be sprayed using the agricultural sprayer, determining a geoposition associated with the agricultural sprayer within a field, determining if crop planted at the geoposition is tolerant to the herbicide using as-planted data, and if the crop is not tolerant of the herbicide, preventing herbicide spraying operations while the agricultural sprayer is at the geoposition. An agricultural sprayer adapted for performing the method is also provided.

20 Claims, 7 Drawing Sheets

METHOD AND SYSTEM FOR PREVENTING HERBICIDE APPLICATION TO NON-TOLERANT CROPS

CROSS-REFERENCE TO RELATED APPLICATIONS

This application claims priority under 35 U.S.C. §119 of a provisional application Ser. No. 60/989,350 filed Nov. 20, 2007, which application is hereby incorporated by reference in its entirety.

FIELD OF THE INVENTION

The field of the invention is crop management.

BACKGROUND OF THE INVENTION

Advanced agricultural methods such as precision farming, the need for refugia for biotech crops, or resistance to multiple herbicides can create challenges for use of the right herbicide for weed control during the growing season. For example, hybrids may be resistant to at least one or more common non-selective herbicides. Examples of such common non-selective herbicides include glyphosate or glufosinate. Other examples of herbicides include acetolactate synthase inhibitor herbicides or ALS-inhibitor herbicides. Classes within this group include sulfonylureas (SUs), imidazolinones (IMIs), triazolopyrimidines (TPs), pyrimidinyl oxybenzoates (POBs), pyrimidinyl thiobenzoates (PTBs), and sylfonylamino carbonyl triazolinones (SCTS). One of the problems this presents is that it is becoming increasingly more difficult and complicated to be certain that a given crop in a field is indeed tolerant or resistant to a given non-selective herbicide. A single hybrid may have stacked or multiple herbicide resistance trait, thus increasing the complexity in making certain that a given crop in a field is tolerant or resistant to a particular non-selective herbicide.

Previous solutions might include using hand-drawn notes or field records, or if an as-planted map exists, a copy of the map could be carried by the sprayer operator. However, accuracy of the application largely depends on the accuracy of the archive and the judgment of the participants.

What is needed is a method and apparatus for an agricultural sprayer that prevents spraying herbicides on crops which are not resistant or tolerant of the herbicides.

SUMMARY

A method controlling an agricultural sprayer includes identifying an herbicide to be sprayed using the agricultural sprayer, determining a geoposition associated with the agricultural sprayer within a field, determining if crop planted at the geoposition is tolerant to the herbicide using as-planted data, and if the crop is not tolerant of the herbicide, preventing herbicide spraying operations while the agricultural sprayer is at the geoposition. An agricultural sprayer adapted for performing the method is also provided.

DETAILED DESCRIPTION OF THE PREFERRED EMBODIMENT

An agricultural sprayer is controlled using as-planted data to assist in identifying whether the crop being sprayed is herbicide resistant to or tolerant of the herbicide being sprayed. The as-planted data may be used to create a georeferenced electronic record which may be used to control a sprayer. Software in a spray controller may prevent the application of the non-selective herbicide unless the sprayer is located inside the selected polygon (identifying a particular a field or portion of a field) that indicates that the crop planted there is the proper hybrid or variety that contains the appropriate genetic tolerance to the herbicide.

Figure 1:
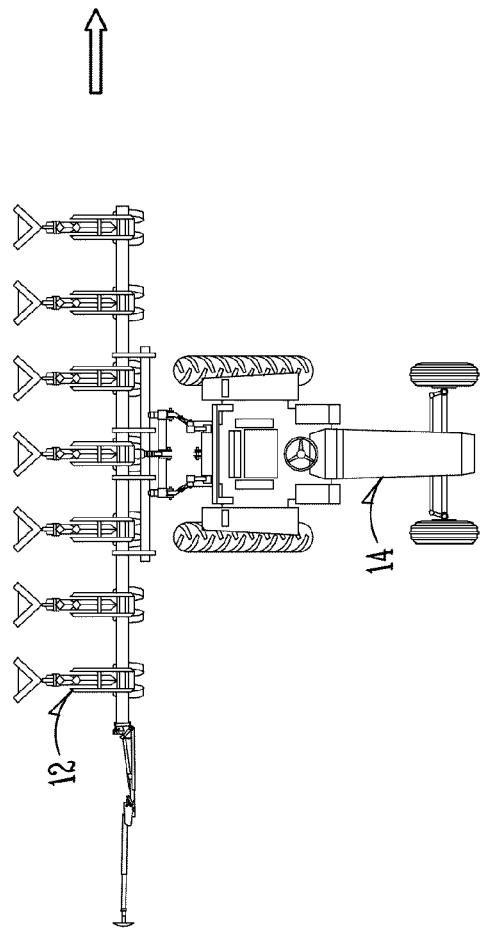
FIG. 1 is a pictorial representation showing information flow.
Figure 1:
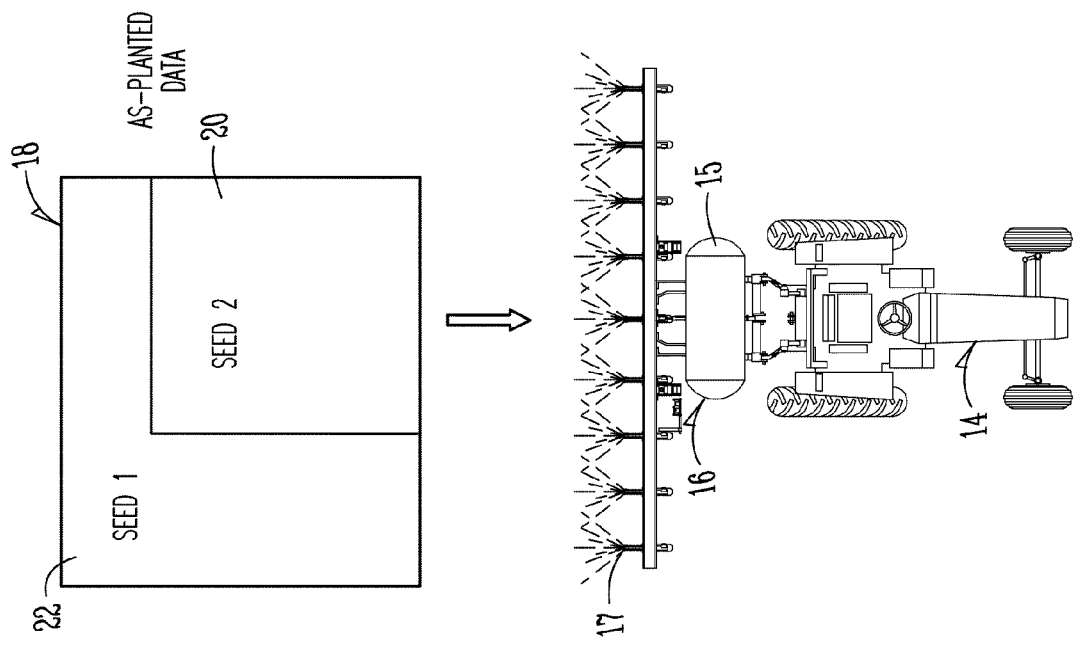

FIG. 1 provides a pictorial representation showing information flow. In FIG. 1, a planter 12 is shown which is operatively connected to a tractor 14. During the planting process, information used to provide as-planted data 18 is collected which can be used in constructing in as-planted map by identifying different regions, such as region 20, associated with a first hybrid or variety and a second region 22, associated with a second hybrid or variety. Based on the herbicide tolerance of each hybrid or variety, information is provided to support spraying operations performed by a tractor 14 with a sprayer 16. Although a tractor 14 is shown with a sprayer 16 being towed, the sprayer may be configured in any number of ways, including as a spray cart, as a self-propelled implement, mounted directly on the tractor 14 or otherwise. The sprayer 16 shown includes a spray tank 15 for holding a fluid such a liquid containing a herbicide. Also shown in FIG. 1 are nozzles 17 which are used to spray the herbicide onto the field.

In operation, the as-planted data is used to identify the different hybrids/varieties at different locations. This information is used in the spraying process to only permit spraying of a particular herbicide at locations associated with a hybrid or variety that is herbicide resistant to the herbicide.

Figure 2:
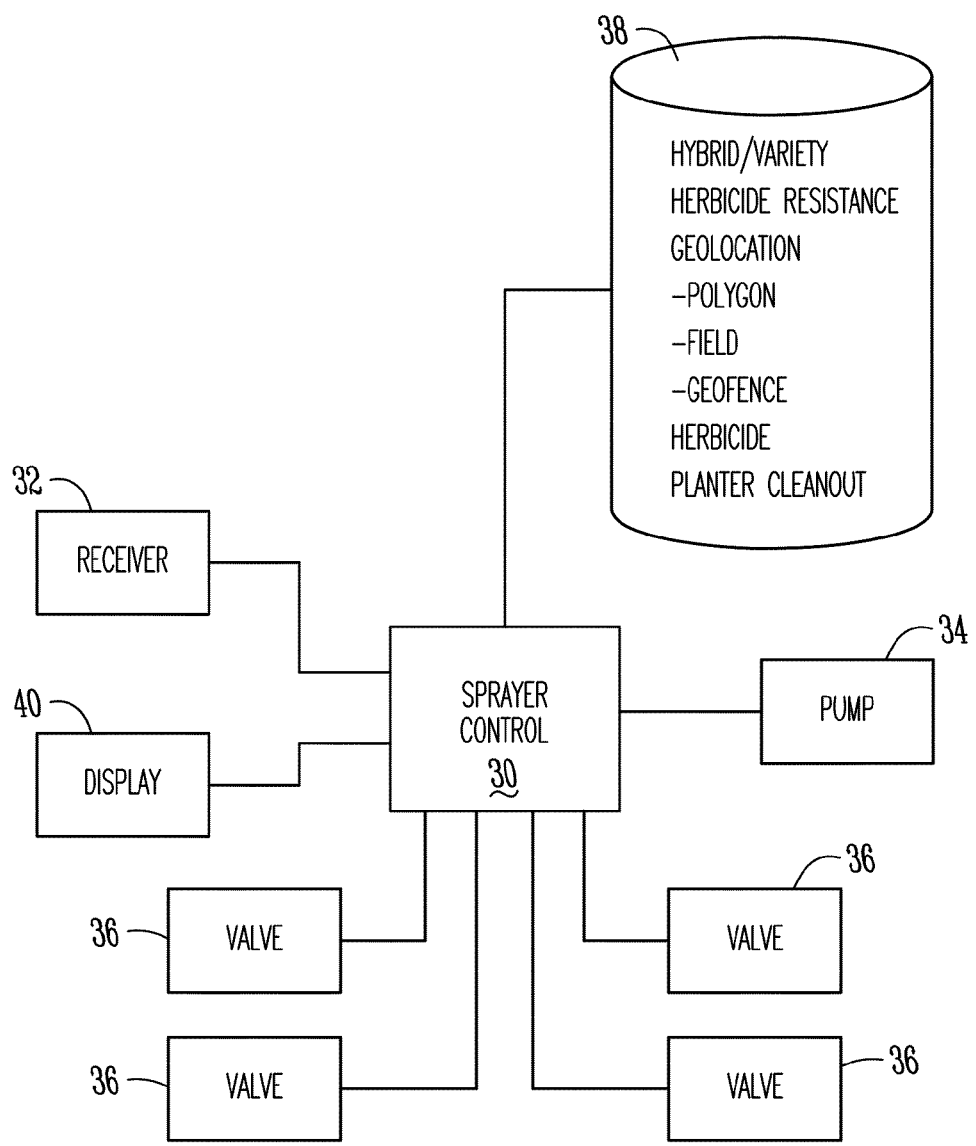
FIG. 2 is a block diagram of a sprayer control system.

FIG. 2 is a block diagram of a sprayer control system. In FIG. 2, a sprayer control 30 is shown. The sprayer control 30 may include a microcontroller, a microprocessor, or other type of intelligent control. The intelligence may be provided through software or hardware implementation. The sprayer control 30 is electrically connected to a GPS receiver 32 or other geolocation determining device. The sprayer control 30 is also electrically connected to a pump 34. The sprayer control 30 is also electrically connected to one or more valves 36 for controlling spraying operations. The sprayer control 30 also is electrically connected to data 38. The data 38 includes information such as hybrid or variety identification data, herbicide resistance data associated with the hybrid or variety identification data, and/or geolocation data associated with planting. The data 38 may also include herbicide data such as a herbicide identifier associated with the herbicide to be applied. The data 38 may also include planter cleanout and planter fill data associated with planting.

The sprayer control 30 uses data sufficient to determine whether or not spraying should be allowed at a particular location or not. This may include an electronic record constructed using as-planted data, information about the herbicide currently being used, and geoposition information from a GPS receiver. If spraying is not allowed at a particular location, then the sprayer control may shut off any one or more of valves 36, shut down the pump 34, and/or provide an alert on a display 40 electrically connected to the sprayer control 30. The sprayer control 30 may be located at a sprayer or may be placed in a cab of a tractor used with the sprayer. The sprayer control 30 may be software running on a computer within the cab of the tractor which provides other functionalities.

Figure 3:
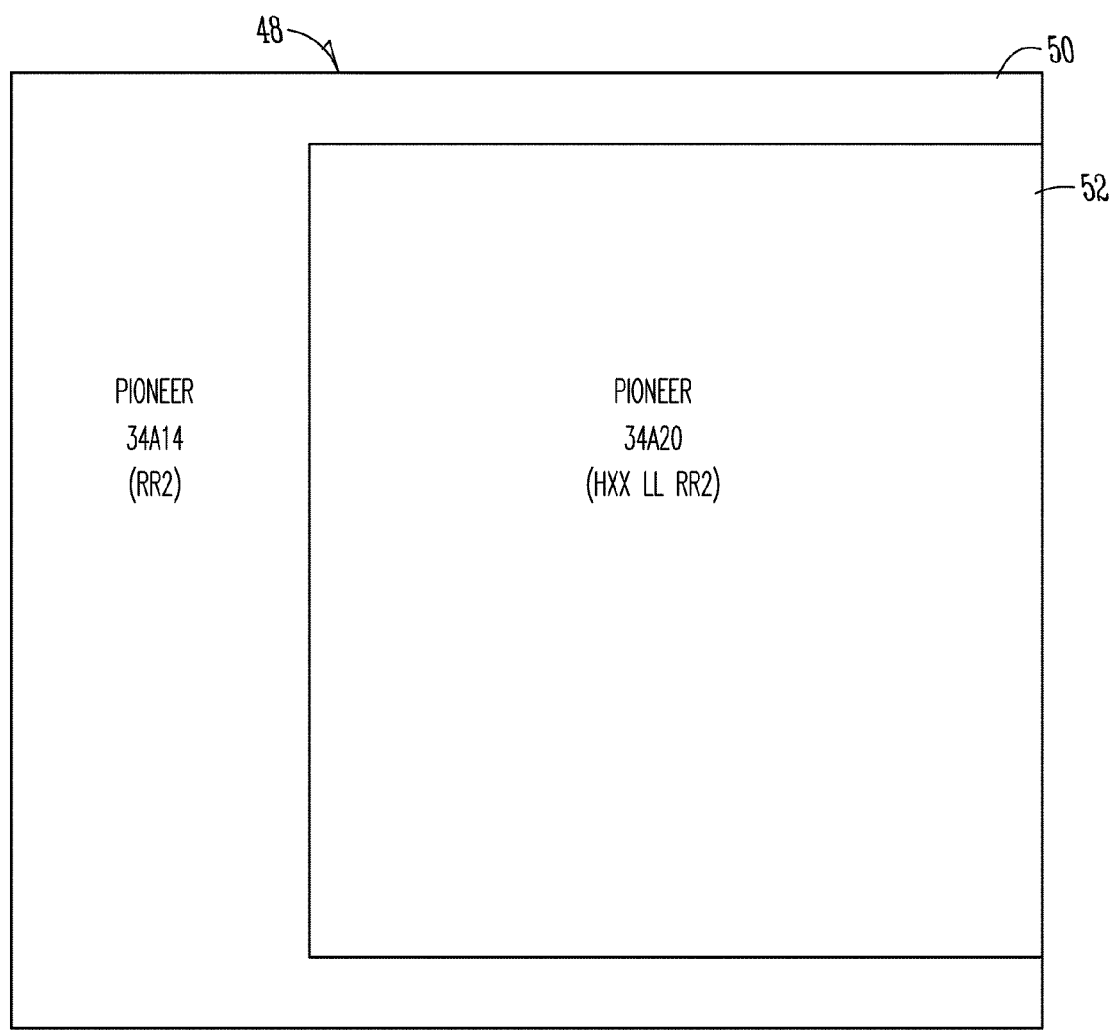
FIG. 3 is a diagram illustrating an as-planted map.

FIG. 3 is a diagram illustrating an as-planted map. As shown in FIG. 3, a land area 48 is divided into a first region 52 where a first hybrid or variety is planted and a second region 50 where a second hybrid or variety is planted. In this example, Pioneer 34A20 (HXX LL RR2) is planted in the first region 52 while Pioneer 34A14 (RR2) is planted in the second region 50. In the as-planted map of FIG. 3, there is planter cleanout at the fill events. In typical operation, the same planter is used to plant two different hybrids or varieties of seed. At some point in the planting process, the crop producer switches from the first hybrid or variety to the second hybrid or variety. In the as-planted map of FIG. 3, the crop producer cleans out the planter when planting of the first hybrid or variety is complete and prior to filling the planter with the second hybrid or variety.

Figure 4:
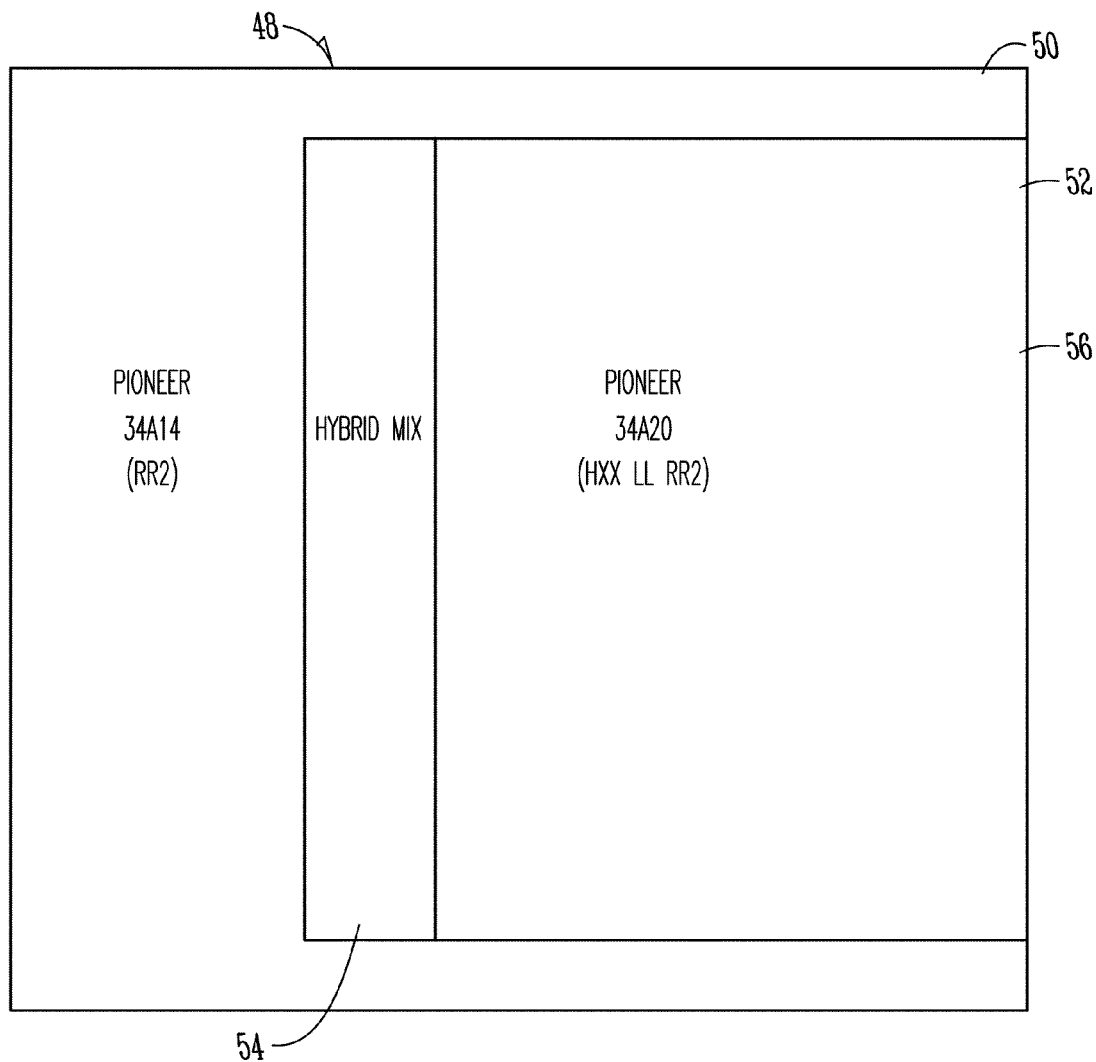
FIG. 4 is a diagram illustrating an as-planted map where a planter was not cleaned out during a fill event.

FIG. 4 is a diagram illustrating an as-planted map where a planter was not cleaned out during a fill event. The land area 48 is divided into a first region 52 where a first hybrid or variety is planted and a second region 50 where a second hybrid or variety is planted. As in FIG. 3, Pioneer 34A20 (HXX LL RR2) is planted in the first region 52 while Pioneer 34A14 (RR2) is planted in the second region 50. However, there is also a third region 54 associated with hybrid mix. As shown in FIG. 4, the first region 52 is now segmented into sub-region 56 where only Pioneer 34A20 (HXX LL RR2) is planted and the third region 54. Because the planter is not cleaned out during a fill event, there is a time period during planting where a mix of seed is planted, some of the first hybrid or variety and some of the second hybrid or variety. The area 54 associated with the hybrid mix may be relatively small, such as one or two passes of the planter, but is still present.

The information from the as-planted maps of FIG. 3 and FIG. 4 is important for a variety of reasons. It identifies locations which can be associated with areas, regions, boundaries such as those defined by polygons, or sometimes referred to as geo-fences which is understood to be a boundary formed from geolocation information. In addition, the as-planted data identifies the type of hybrid or varieties present. This may also include traits of the hybrid or varieties present, especially herbicide resistant traits. Alternatively, information regarding the herbicide resistant traits may be determined through other means based on the identified hybrid or varieties present.

Figure 5:
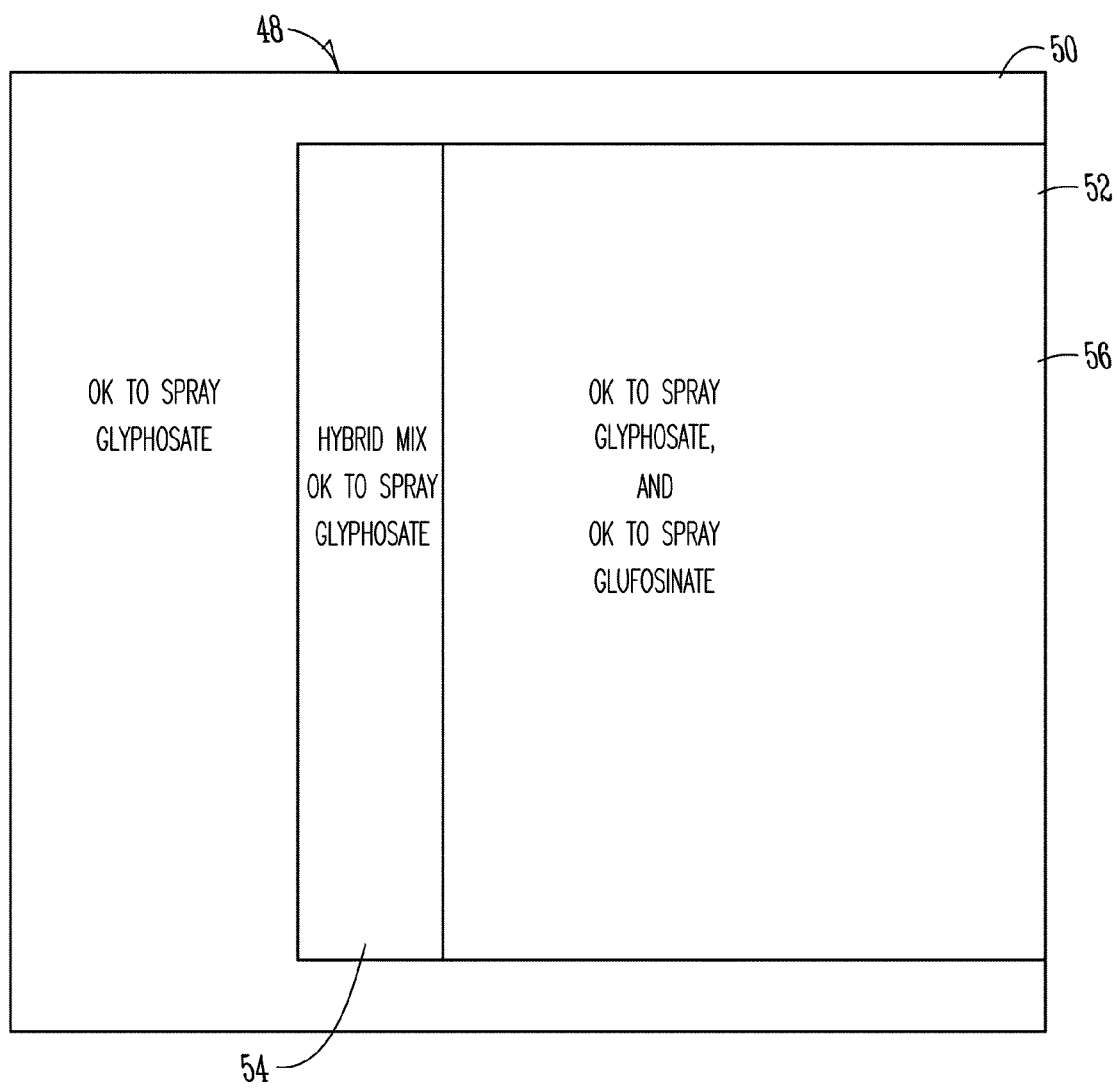
FIG. 5 is a diagram illustrating a spray map corresponding with the as-planted map of FIG. 4
FIG. 6 provides a spray map for glyphosate.

Based on this information and knowing the type of herbicide being used, a spray map may be generated as shown in FIG. 5. The spray map of FIG. 5 corresponds with the as-planted map of FIG. 4. Note the spray map indicates that it is okay to spray glyphosate and okay to spray glufosinate in region 56. The spray map indicates that it is okay to spray glyphosate in region 50 as well as region 54. It should be apparent from the spray map that it is not okay to spray glufosinate in region 50 or region 54.

The hybrid planted in region 56 has a genetic trait associated with being resistant to glyphosate (such as a ROUNDUP READY® trait). The hybrid planted in region 56 also has a genetic trait associated with being resistant to glufosinate (such as a LIBERTY LINK® trait). Thus, either glyphosate and/or glufosinate may be used as a herbicide in that region. However, the hybrid planted in region 50 only has a glyphosate resistance trait and not a glufosinate trait, thus no glufosinate should be applied. Because the hybrid mix region 54 includes both types of hybrids, only glyphosate based herbicides should be used.

Figure 6:
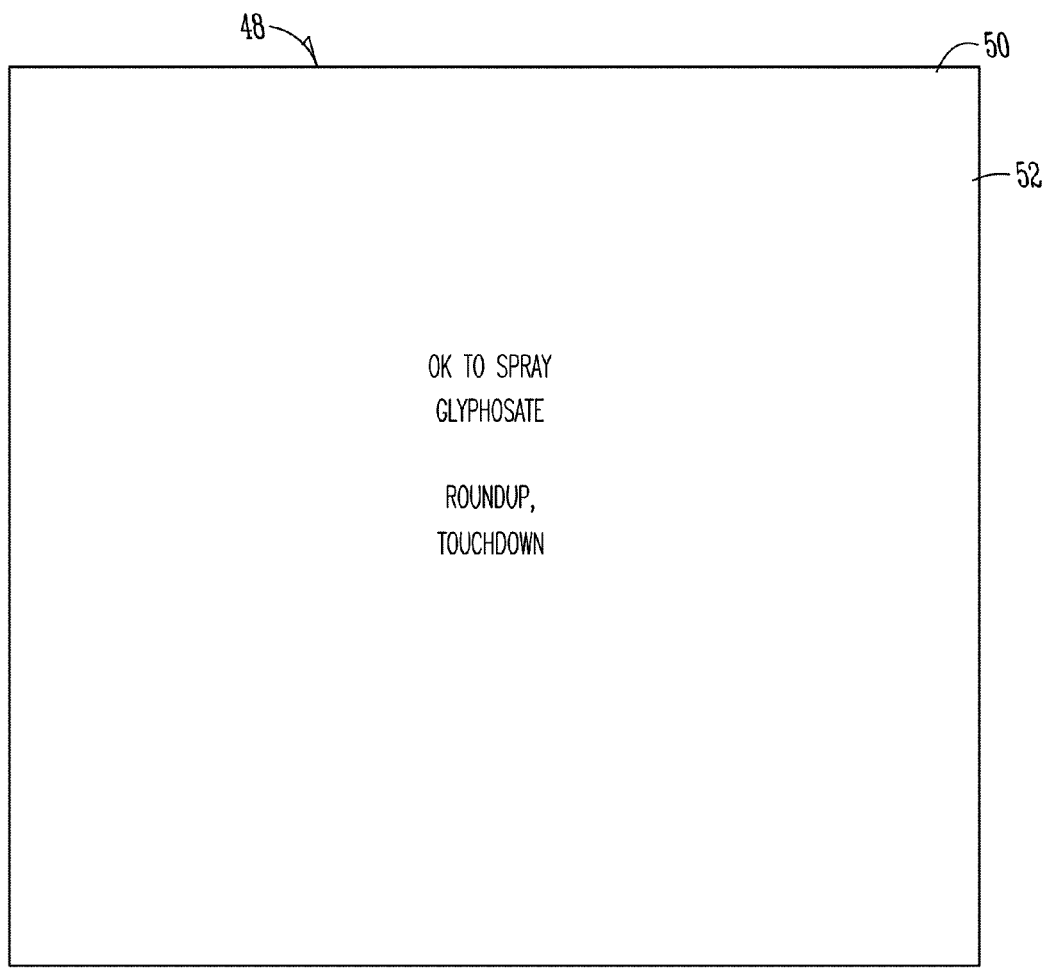

FIG. 6 provides a spray map for glyphosate. Examples of herbicides using glyphosate as the active ingredient include ROUNDUP® available from Monsanto Company (St. Louis, Mo.) and TOUCHDOWN® available from Syngenta Crop Protection, Inc. (Greensboro, N.C.). In FIG. 6, the entire region 48 may be sprayed with a glyphosate.

Figure 7:
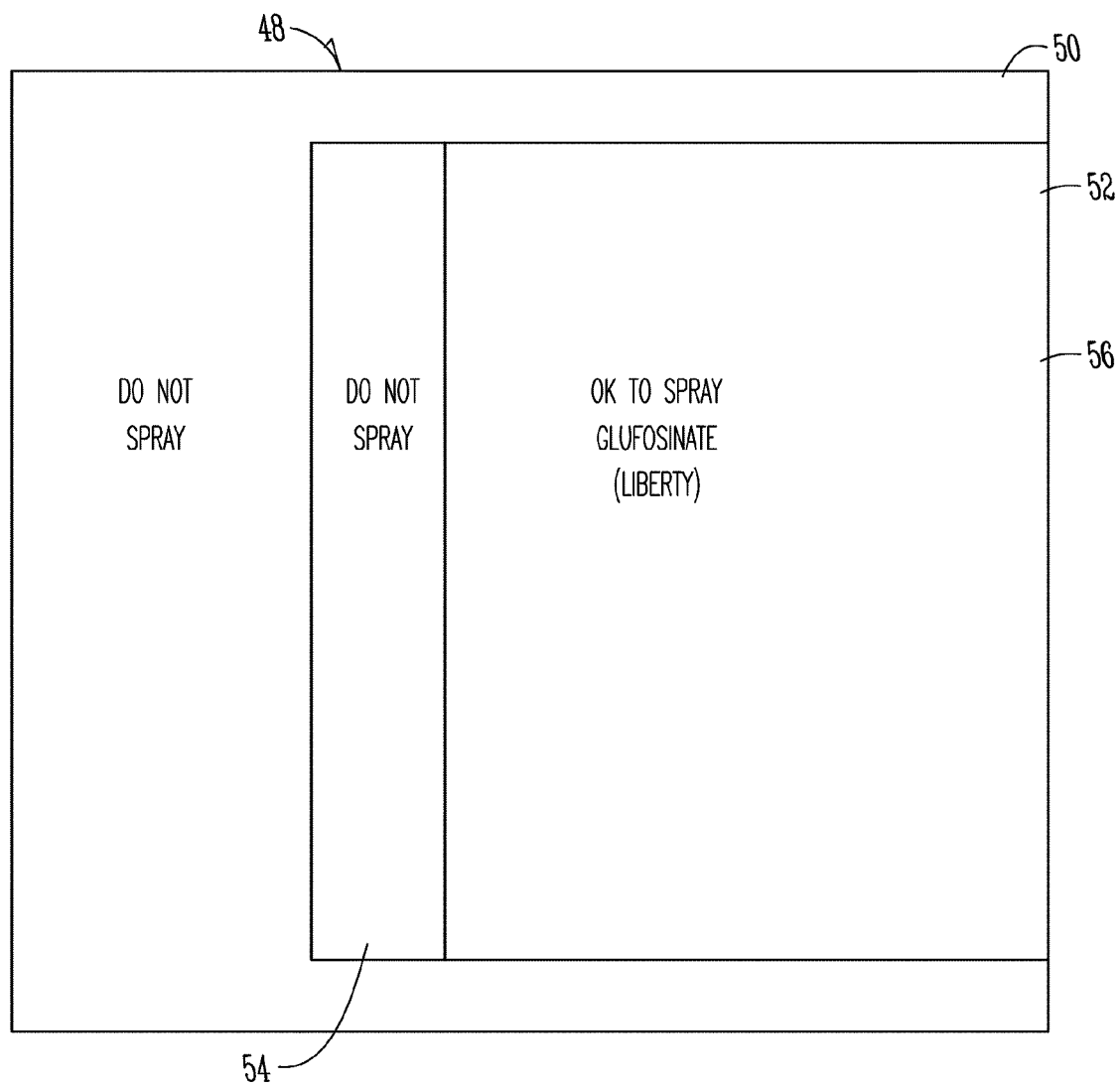
FIG. 7 provides a spray map for glufosinate.

FIG. 7 provides a spray map for glufosinate. Examples of herbicides using glufosinate as the active ingredient include LIBERTY® available from Bayer Crop Science, Inc. (Triangle Park, N.C.). As shown in FIG. 7, regions 50 and 54 should not be sprayed with a herbicide containing a glufosinate, and only region 56 may be sprayed.

As indicated by the maps of FIG. 3-7, the planting of adjacent hybrids or varieties with different genetic traits adds complexity to the spraying process. Should mistakes be made as to what herbicide to use at what location, the crop may be inadvertently killed resulting in financial loss. By controlling the sprayer using information about crops planted, geospatial information regarding where the crops are planted, information about the resistance or tolerance of particular crops to particular herbicides, mistakes regarding spraying may be reduced or eliminated. In addition, even planter fill events may be taken into account so that spraying may be properly controlled in areas where there is a mix of hybrids.

That which has been described is merely exemplary. Various options and alternatives are contemplated. For example, the herbicide may include glyphosates, glufosinates, or other types of chemicals. The herbicide may be an ALS-inhibitor herbicide. The agricultural sprayer may be attached to a tractor, may be towed, or may be self-propelling.

What is claimed is:

1. A method for controlling an agricultural sprayer, comprising:
    identifying an herbicide to be sprayed using the agricultural sprayer;
    determining a geoposition of a crop associated with the agricultural sprayer within a field;
    receiving herbicide resistance data associated with the crop at the determined geoposition associated with the agricultural sprayer;
    determining, via sprayer control hardware, if the crop planted at the geoposition associated with the agricultural sprayer is tolerant to the identified herbicide to be sprayed using as-planted data and the received herbicide resistance data associated with the crop;
    if the crop is determined not to be tolerant of the herbicide, preventing spraying of the herbicide while the agricultural sprayer is at the geoposition.

2. The method of claim 1 wherein the step of determining if the crop planted at the geoposition is tolerant to the identified herbicide to be sprayed using the as-planted data and the received herbicide resistance data comprises constructing a polygon containing the crop from the as-planted data and determining if the crop planted within the polygon is tolerant to the herbicide.

3. The method of claim 1 further comprising if the crop is tolerant of the identified herbicide, allowing spraying of the herbicide while the agricultural sprayer is at the geoposition.

4. The method of claim 1 wherein the as-planted data defines a first region wherein a first hybrid is planted and a second region wherein a second hybrid is planted and wherein one of the first hybrid and the second hybrid comprises a genetic trait for the herbicide resistance for the herbicide.

5. The method of claim 4 wherein the as-planted data further defines a third region adjacent to the first region and the second region which includes a hybrid mix wherein both the first hybrid is planted and the second hybrid is planted.

6. The method of claim 4 wherein the as-planted data includes identifying information for each of the first hybrid and the second hybrid, and wherein the herbicide resistance data includes herbicide resistance traits for each of the first hybrid and the second hybrid.

7. The method of claim 4 wherein the as-planted data includes cleanout and fill data for a planter used while collecting the as-planted data.

8. The method of claim 1 wherein the step of preventing spraying of the herbicide while the agricultural sprayer is at the geoposition comprises shutting at least one valve associated with the spraying of the herbicide.

9. The method of claim 1 wherein the step of determining a geoposition of a crop associated with the agricultural sprayer within a field is performed using a GPS receiver.

10. A method comprising:
receiving as-planted map data for a land area, the as-planted map data identifying a first boundary associated with planting of a first hybrid or variety of seed, and a second boundary associated with planting of a second hybrid or variety of seed;
identifying a planter fill event associated with the as-planted map data occurring between the planting of the first hybrid or variety of seed and the planting of the second hybrid or variety of seed;
identifying a mix area in the land area containing both the first hybrid or variety of seed and the second hybrid or variety of seed;
producing an herbicide application map to prescribe spraying an identified herbicide within the first boundary if the first hybrid or variety of seed is genetically resistant to the herbicide, within the second boundary if the second hybrid or variety of seed is resistant to the herbicide, and within the mix area if both the first hybrid or variety of seed and the second hybrid or variety of seed are genetically resistant to the herbicide;
determining a geoposition of a crop located within at least one of the first boundary, the second boundary, or the mix area and
determining, via sprayer control hardware, whether or not to apply the identified herbicide at the geoposition associated with a crop based on the genetic resistance of the crop indicated in the herbicide application map.

11. The method of claim 10 further comprising applying the herbicide within the land area using the sprayer based on the herbicide application map.

12. The method of claim 10 wherein the herbicide is a glyphosate herbicide.

13. The method of claim 10 wherein the herbicide is a glufosinate herbicide.

14. A method for controlling an agricultural sprayer, comprising:
identifying an herbicide to be sprayed using the agricultural sprayer;
determining a geoposition of a crop associated with the agricultural sprayer within a field;
determining control hardware, whether or not to apply the identified herbicide to be sprayed at the geoposition of the crop according to an herbicide application map that indicates an herbicide resistance of the crop at the determined geoposition;
wherein the herbicide application map is produced by:
receiving as-planted map data for a land area, the as-planted map data identifying a first boundary associated with planting of a first hybrid or variety of seed, a second boundary associated with planting of a second hybrid or variety of seed,
identifying a planter fill event associated with the as-planted map data occurring between the planting of the first hybrid or variety of seed and the planting of the second hybrid or variety of seed,
identifying a mix area in the land area containing both the first hybrid or variety of seed and the second hybrid or variety of seed,
producing the herbicide application map to prescribe spraying the identified herbicide within the first boundary if the first hybrid is genetically resistant to the herbicide, within the second boundary if the second hybrid is resistant to the herbicide, and within the mix area if both the first hybrid and the second hybrid are genetically resistant to the herbicide.

15. The method of claim 14 wherein the herbicide is a glyphosate herbicide.

16. The method of claim 14 wherein the herbicide is a glufosinate herbicide.

17. An agricultural sprayer comprising:
a sprayer control system electrically connected to a plurality of valves for controlling application of an herbicide to a land area;
a GPS receiver electrically connected to the sprayer control system for providing a geoposition associated with a crop to the sprayer control system;
wherein the sprayer control system is configured to:
receive as-planted data for the land area, the as-planted data identifying a first boundary associated with planting of a first hybrid or variety of seed and a second boundary associated with planting of a second hybrid or variety of seed,
identify a planter fill event associated with the as-planted data occurring between the planting of the first hybrid or variety of seed and the planting of the second hybrid or variety of seed,
identify a mix area in the land area containing both the first hybrid or variety of seed and the second hybrid or variety of seed,
determine whether the crop associated with the geoposition is genetically resistant to the herbicide to be applied based on whether the geoposition is within the first boundary, the second boundary, or the mix area; and
control the spraying of the herbicide at the geoposition associated with the crop based on the determination of whether the crop is genetically resistant to the herbicide.

18. A method, comprising:
identifying an herbicide to be applied;
determining a geoposition of a crop;
receiving herbicide resistance data associated with the crop at the determined geoposition;
determining, via sprayer control hardware, if the crop at the geoposition is tolerant to the identified herbicide to be applied using as-planted data and the received herbicide resistance data associated with the crop; and if the crop is determined not to be tolerant of the herbicide, preventing application of the herbicide at the geoposition.

19. The method of claim 18 wherein the step of preventing application of the herbicide at the geoposition comprises controlling an agricultural spray to prevent the application of the herbicide at the geoposition.

20. The method of claim 18 wherein the step of determining if the crop at the geoposition is tolerant to the identified herbicide to be applied comprises determining if the received herbicide resistance data indicate that genetics for the crop include a genetic trait for resistance to the herbicide.

* * * * *